US009266396B2

(12) United States Patent
Hatanaka et al.

(10) Patent No.: US 9,266,396 B2
(45) Date of Patent: Feb. 23, 2016

(54) PNEUMATIC RADIAL TIRE FOR PASSENGER CARS

(75) Inventors: Shintaro Hatanaka, Kodaira (JP); Isao Kuwayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 219 days.

(21) Appl. No.: 13/883,661

(22) PCT Filed: Oct. 13, 2011

(86) PCT No.: PCT/JP2011/005743
§ 371 (c)(1),
(2), (4) Date: May 6, 2013

(87) PCT Pub. No.: WO2012/066725
PCT Pub. Date: May 24, 2012

(65) Prior Publication Data
US 2013/0220501 A1    Aug. 29, 2013

(30) Foreign Application Priority Data

Nov. 15, 2010    (JP) ................................. 2010-255056

(51) Int. Cl.
*B60C 11/03*    (2006.01)
*B60C 11/04*    (2006.01)
*B60C 3/04*    (2006.01)

(52) U.S. Cl.
CPC . *B60C 11/03* (2013.01); *B60C 3/04* (2013.01); *B60C 11/0304* (2013.04); *B60C 11/04* (2013.01); *B60C 11/042* (2013.04);
(Continued)

(58) Field of Classification Search
CPC .. B60C 11/0304; B60C 11/04; B60C 11/042; B60C 11/0332; B60C 11/03; B60C 2011/0341; B60C 2011/0344; B60C 2011/0348; B60C 2011/0351; B60C 2011/0353; B60C 2011/0355; B60C 2011/0358; B60C 2011/036; B60C 2011/0362; B60C 2011/0367; B60C 2011/0369; B60C 2011/0372; B60C 2011/0381; B60C 2011/0383
USPC ............................................ 152/209.8, 209.9
See application file for complete search history.

(56) References Cited

U.S. PATENT DOCUMENTS

2008/0196806 A1* 8/2008 Matrascia et al. ....... 152/209.16
2010/0212792 A1    8/2010 Mita

FOREIGN PATENT DOCUMENTS

CN    1812891 A    8/2006
JP    H05162506 A    6/1993
(Continued)

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

The pneumatic radial tire for passenger cars according to the present invention specifies the ratio W/L between the section width W and outside diameter L and includes a width direction groove located at an appropriate position on the tread surface.

23 Claims, 9 Drawing Sheets

(52) U.S. Cl.
CPC . *B60C2011/0341* (2013.04); *B60C 2011/0358* (2013.04); *B60C 2011/0381* (2013.04)

(56) References Cited

FOREIGN PATENT DOCUMENTS

| | | | | |
|---|---|---|---|---|
| JP | 7-40706 A | 2/1995 | | |
| JP | H1024714 A | 1/1998 | | |
| JP | 11-198608 | * | 7/1999 | .............. B60C 11/04 |
| JP | 2000-190706 A | 7/2000 | | |
| JP | 2003-146023 A | 5/2003 | | |
| JP | 2007-331411 A | 12/2007 | | |
| JP | 2010-6096 A | 1/2010 | | |
| JP | 2010-215221 A | 9/2010 | | |

OTHER PUBLICATIONS

Machine translation of JP11-198608 (no date).*
International Search Report for PCT/JP2011/005743 dated Jan. 17, 2012.
Chinese Office Action dated Feb. 3, 2015, issued in corresponding Chinese Patent Application No. 201180064458.8.
Communication from the Japanese Patent Office dated Oct. 28, 2014 in corresponding Japanese Application No. 2012-544086.
Japanese Office Action dated Jan. 27, 2015, issued in corresponding Japanese Patent Application No. 2012544086.
Communication dated Aug. 7, 2015 from the State Intellectual Property Office of the P.R.C. in counterpart application No. 201180064458.8.

* cited by examiner (a)　　　　　　　　　(b)

(a)

(b)

(a)

(b)

(c)

(a)

(b)

PNEUMATIC RADIAL TIRE FOR PASSENGER CARS

CROSS REFERENCE TO RELATED APPLICATIONS

This application is a National Stage of International Application No. PCT/JP2011/005743 filed Oct. 13, 2011, claiming priority based on Japanese Patent Application No. 2010-255056 filed Nov. 15, 2010, the contents of all of which are incorporated herein by reference in their entirety.

TECHNICAL FIELD

The present invention relates to a pneumatic radial tire for passenger cars, and in particular to a pneumatic radial tire for passenger cars that enhances fuel efficiency and passenger comfort as well as cornering power and wear resistance when mounted as a tire for electric vehicles.

BACKGROUND ART

Until the 1960s, vehicles were lightweight and were not expected to be high-speed. The burden on tires was therefore low, and bias tires with a narrow section width were used. These days, however, as vehicles have increased in weight and speed, radial tires with a larger width have been adopted (for example, Patent Literature 1).

As compared to a bias tire, a tire with a radial carcass has a more rigid tire crown and thus has excellent resistance to uneven wear. Since the crown is rigid and propagation of movement between structural members of the tire is suppressed, rolling resistance is reduced. Therefore, tires with a radial carcass have good fuel efficiency and high cornering power.

The increased tire width also increases the contact patch area of the tire, thereby increasing the cornering power.

The increased tire width, however, reduces passenger comfort by compressing the vehicle space. Air resistance also increases, causing the problem of poor fuel efficiency.

In recent years, increased concerns for environmental issues have led to more stringent demands for fuel efficiency. In particular, in electric vehicles, which are becoming a practical vehicle for the future, it is necessary to guarantee space around the tire axle for storing drive components, such as a motor that controls torque for rotating the tire. The importance of guaranteeing space around tires is thus increasing.

CITATION LIST

Patent Literature

PTL 1: JP7040706A

SUMMARY OF INVENTION

The present invention has been conceived in light of the above problems, and it is an object thereof to achieve a low air resistance (Cd value) for a vehicle on which the tire is mounted and a low rolling resistance (RR value) for the tire, to guarantee good fuel efficiency and vehicle space, and furthermore to enhance the cornering power and wear resistance in such a tire for electric vehicles.

The inventors intensely studied how to solve the above problems.

As a result, the inventors discovered that controlling the tire section width W and outside diameter L of a radial tire to be within an appropriate ratio is extremely effective for enhancing fuel efficiency and passenger comfort.

After thoroughly studying how to improve the cornering power and wear resistance of such a radial tire controlled to be within the above ratio, the inventors discovered the importance of suppressing lifting in the contact patch, near the middle of the tread half width (i.e. the ¼ point) at the outer half of the tread surface of the vehicle-mounted tire.

Upon repeated examination of a method for suppressing lifting in the contact patch, the inventors discovered that in addition to controlling the above ratio, the bending deformation of the belt can be suppressed by providing a transverse groove in a land portion that is located at an appropriate position of the tread surface, the transverse groove extending in the tread width direction and terminating within the land portion. The inventors discovered that as a result, lifting in the contact patch can be suppressed, and both cornering power and wear resistance of the tire can be enhanced.

Furthermore, the inventors discovered that by providing the transverse groove, the weight of the tire decreases, thereby reducing the rolling resistance and further increasing the fuel efficiency.

Primary features of the present invention for resolving the above problems are as follows.

(1) A pneumatic radial tire for passenger cars, provided with a pair of bead portions, a carcass formed by a ply of radial cords toroidally extending between the bead portions, and a tread, comprising: a section width W and an outside diameter L such that a ratio W/L is 0.24 or less; a tread edge main groove in at least one half of a surface of the tread divided by a tire equatorial plane, the tread edge main groove being adjacent to a tread edge, separated from the tread edge in a tread width direction by a distance of at least 25% of a tread width TW, and extending in a tread circumferential direction; and at least one transverse groove in an adjacent land portion adjacent to a tread edge land portion defined by the tread edge main groove and the tread edge, the transverse groove extending from the tread edge main groove in the tread width direction and terminating within the adjacent land portion.

(2) The pneumatic radial tire for passenger cars according to (1), wherein the at least one transverse groove comprises a plurality of transverse grooves at intervals in the tread circumferential direction of E/4 (mm) or more, where E is a contact length of the tire in mm.

(3) The pneumatic radial tire for passenger cars according to (1) or (2), wherein in the half including the transverse groove, the following relationship is satisfied:

$$B/3 \leq C \leq 2B/3$$

where B is a width of the adjacent land portion in the tread width direction in mm and C is a length of the transverse groove in the tread width direction in mm.

(4) The pneumatic radial tire for passenger cars according to (1), further comprising an auxiliary groove extending in the tread circumferential direction in the tread edge land portion within the half including the transverse groove.

(5) The pneumatic radial tire for passenger cars according to (4), further comprising at least one width direction groove, at intervals in the tread circumferential direction, in a subland portion defined by the tread edge main groove and the auxiliary groove, the at least one width direction groove extending in the tread width direction and connecting the tread edge main groove and the auxiliary groove.

According to the present invention, it is possible to provide a pneumatic radial tire for passenger cars with reduced air resistance (Cd value) of the vehicle and rolling resistance (RR value) of the tire, excellent fuel efficiency and passenger comfort for the vehicle, and furthermore excellent cornering power and wear resistance of the tire.

BRIEF DESCRIPTION OF DRAWINGS

The present invention will be further described below with reference to the accompanying drawings, wherein.

DESCRIPTION OF EMBODIMENTS

The following describes the process that led to the pneumatic radial tire for passenger cars according the present invention.

Figure 1:
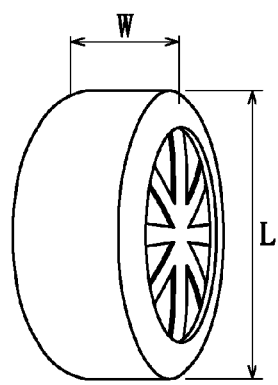
FIG. 1 illustrates the section width W and outside diameter L of a tire.
Figure 2:
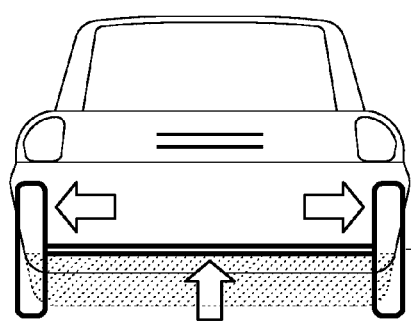
FIG. 2(a) illustrates a vehicle having mounted thereon tires according to the present invention with an enlarged diameter and reduced width.
FIG. 2(b) illustrates a vehicle having mounted thereon conventional tires.
Figure 2:
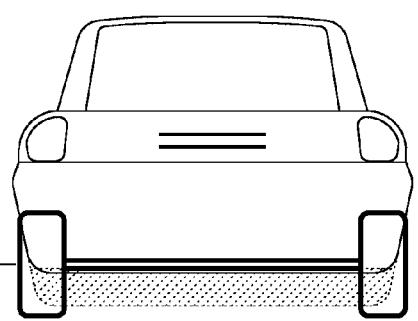

First, the inventors focused on the section width W of a radial tire, as illustrated in FIG. 1, and discovered that decreasing the section width W as compared to a conventional value allows for vehicle space to be guaranteed, as illustrated in FIG. 2. In particular, space is guaranteed for installing drive components near the inside of the vehicle-mounted tire.

Moreover, decreasing the tire section width W reduces the area when viewing the tire from the front (hereinafter referred to as front projected area), thus achieving the effect of reducing the air resistance of the vehicle.

Since deformation in the contact portion increases, however, a problem occurs in that at the same air pressure, the rolling resistance of the tire increases.

On the other hand, the inventors discovered that the above problem can be solved by properties particular to a radial tire. Specifically, since deformation of the tread in a radial tire is less than in a bias tire, the inventors focused on the outside diameter L of a radial tire as illustrated in FIG. 1 and discovered that increasing the outside diameter L as compared to a conventional value reduces the effect of roughness of the road surface, allowing for a reduction in the rolling resistance at the same air pressure. The inventors further discovered that increasing the diameter also enhances the load capability of the tire, and moreover, as illustrated in FIG. 2, that a larger diameter for a radial tire increases the height of the wheel shaft, expanding the under floor space and thereby guaranteeing space for the trunk or the like of the vehicle and space for installing drive components.

Here, as described above, decreasing the width and increasing the diameter of the tire both achieve the effect of guaranteeing vehicle space, yet are a trade-off with regards to the rolling resistance. The air resistance of the vehicle can also be reduced by reducing the width of the tire.

The inventors thoroughly studied the air resistance and rolling resistance in order to enhance these characteristics as compared to a conventional radial tire by optimizing the balance between the tire section width and the tire outside diameter.

Focusing on the ratio W/L of the tire section width W to the tire outside diameter L, the inventors performed tests to measure the air resistance and the rolling resistance after mounting tires with various tire sizes, including nonstandard sizes, on a vehicle. The inventors thus derived conditions on the ratio W/L for which these characteristics both exceed those of a conventional radial tire.

The following describes the test results that led to the derivation of the preferred range for the ratio W/L in detail.

Figure 3:
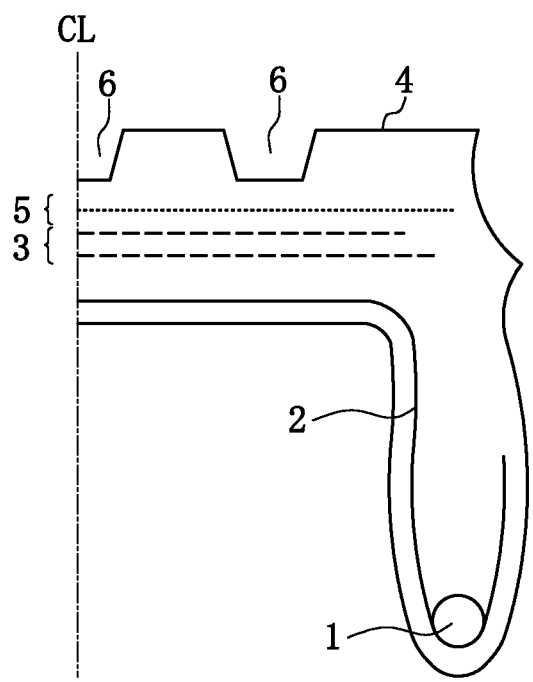
FIG. 3(a) is a schematic cross-sectional diagram of a radial tire used in a test of the present invention.
FIG. 3(b) is a cross-sectional diagram in the width direction of a tire according to an embodiment of the present invention.
Figure 3:
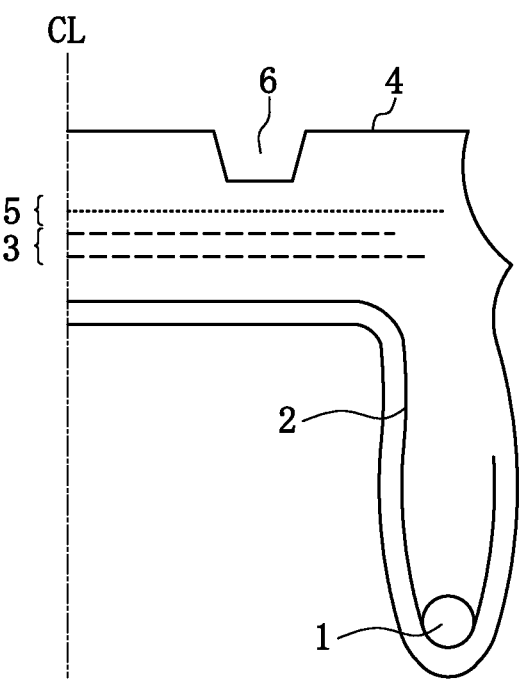

FIG. 3(a) is a schematic cross-sectional diagram in the tire width direction of the radial tire used in the above tests. Note that FIG. 3(a) only shows one half as divided by a tire equator CL. The other half has the same structure and thus is omitted from FIG. 3(a).

As test tires, a plurality of pneumatic radial tires for passenger cars as shown in FIG. 3(a) were produced with different tire sizes. As is customary, each tire was provided with a radial carcass 2 that extends toroidally between a pair of bead cores 1 (only one shown in FIG. 3(a)).

Here, in the tire illustrated in FIG. 3(a), the carcass 2 is constituted by organic fibers, and at the outside, in the tire radial direction, of the crown of the carcass 2, a belt 3 formed from a plurality of belt layers, two layers in FIG. 3(a), and a tread 4 are provided in this order. The two belt layers in FIG. 3(a) are inclined belt layers that are inclined at an angle of 20° to 40° with respect to a tire equatorial plane CL and in which belt cords intersect between layers. A belt reinforcing layer 5, constituted by a rubberized layer of cords extending along the tire equatorial plane CL, is provided at the outside, in the tire radial direction, of the belt layers.

Furthermore, at least one main groove 6 extending in the tire circumferential direction is provided in the tread 4. In the entire tread, three main grooves 6 are provided in the example in FIG. 3(a).

Without being restricted to conventional standards such as JATMA (Japanese tire standards), TRA (American tire standards), ETRTO (European tire standards), or the like, a wide variety of tire sizes were examined, including sizes not meeting the above standards.

With the above basic tire structure, a plurality of test tires were produced with different section widths and outside diameters.

As a conventional tire serving as an assessment standard for the tests, a tire having the above conventional structure and a tire size of 175/65R15 was prepared. A tire of this size is used in the most generic vehicles and is optimal for comparing tire performance.

Table 1 lists the specifications for each tire.

TABLE 1

| | Tire Size | Ratio W/L |
|---|---|---|
| Test Tire 1 | 155/55R21 | 0.22 |
| Test Tire 2 | 165/55R21 | 0.23 |
| Test Tire 3 | 155/55R19 | 0.24 |
| Test Tire 4 | 155/70R17 | 0.24 |
| Test Tire 5 | 165/55R20 | 0.24 |
| Test Tire 6 | 165/65R19 | 0.24 |
| Test Tire 7 | 165/70R18 | 0.24 |
| Test Tire 8 | 165/55R16 | 0.28 |
| Test Tire 9 | 185/60R17 | 0.28 |
| Test Tire 10 | 195/65R17 | 0.28 |
| Test Tire 11 | 205/60R18 | 0.28 |
| Test Tire 12 | 185/50R16 | 0.31 |
| Test Tire 13 | 195/65R15 | 0.31 |
| Test Tire 14 | 205/60R16 | 0.31 |
| Test Tire 15 | 215/60R17 | 0.31 |
| Test Tire 16 | 225/65R17 | 0.31 |
| Conventional Tire | 175/65R15 | 0.28 |

The tests were performed as follows.

Air Resistance (Cd Value)

In a laboratory, the above tires were mounted onto a vehicle with 1500 cc displacement, and the aerodynamic force at a wind speed corresponding to 100 km/h was measured using a floor balance beneath the wheels and assessed using an index with the conventional tire as 100. A lower value indicates a smaller air resistance.

Rolling Resistance (RR Value)

The above tires were mounted on a standard rim, and rolling resistance was measured under the following conditions: air pressure of 220 kPa, applied load of 3.5 kN, and drum revolution speed of 100 km/h.

The assessment results are indicated by an index with the conventional tire as 100. A lower index indicates a smaller rolling resistance.

Figure 4:
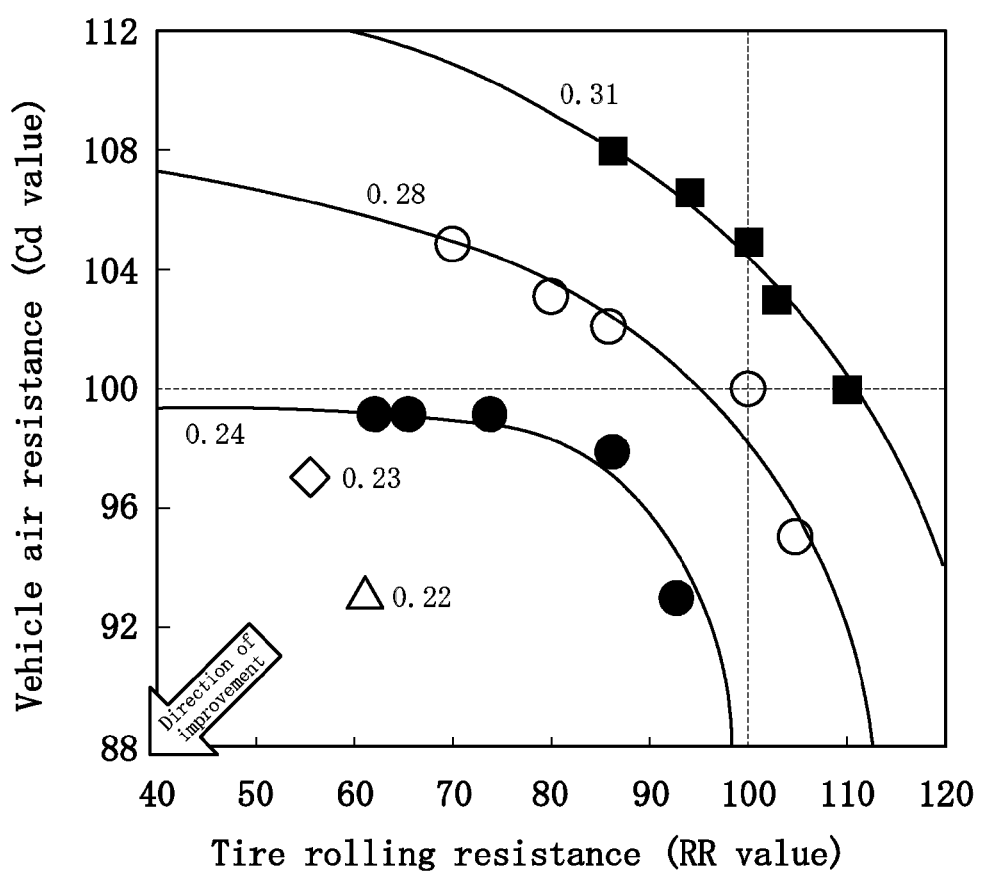
FIG. 4 illustrates the relationship between (i) the ratio W/L of the section width W to the outside diameter L of the tire and (ii) the air resistance (Cd value) of the vehicle and the rolling resistance (RR value) of the tire.

Table 2 and FIG. 4 show the test results.

TABLE 2

| | RR value | Cd value |
|---|---|---|
| Test Tire 1 | 61 | 93 |
| Test Tire 2 | 56 | 97 |
| Test Tire 3 | 92 | 93 |
| Test Tire 4 | 87 | 98 |
| Test Tire 5 | 73 | 99 |
| Test Tire 6 | 66 | 99 |
| Test Tire 7 | 62 | 99 |
| Test Tire 8 | 104 | 95 |
| Test Tire 9 | 87 | 102 |
| Test Tire 10 | 80 | 103 |
| Test Tire 11 | 70 | 105 |
| Test Tire 12 | 110 | 100 |
| Test Tire 13 | 102 | 103 |
| Test Tire 14 | 100 | 105 |
| Test Tire 15 | 93 | 106 |
| Test Tire 16 | 87 | 108 |
| Conventional Tire | 100 | 100 |

Based on the test results in Table 2 and FIG. 4, the inventors discovered that a radial tire with a tire size such that the ratio W/L of the tire section width W to the tire outside diameter L is 0.24 or less has both lower air resistance and rolling resistance than a conventional tire with a tire size of 175/65R15.

Next, the inventors performed the following test on the above test tires in order to confirm that setting the ratio W/L of the tire section width W to the tire outside diameter L actually enhances fuel efficiency and passenger comfort for a vehicle.

Actual Fuel Consumption

A test was performed by running in JOC8 mode. The assessment results are expressed as an index with the assessment result for the conventional tire as 100. A larger index indicates better fuel consumption.

Passenger Comfort

The rear trunk width when mounting the tires on a 1.7 m wide vehicle was measured. The assessment results are expressed as an index with the assessment result for the conventional tire as 100. A larger index indicates better passenger comfort.

Table 3 lists the test results.

TABLE 3

| | Actual Fuel Consumption | Passenger Comfort |
|---|---|---|
| Test Tire 1 | 116 | 102 |
| Test Tire 2 | 117 | 101 |
| Test Tire 3 | 104 | 102 |
| Test Tire 4 | 105 | 102 |
| Test Tire 5 | 110 | 101 |
| Test Tire 6 | 113 | 101 |
| Test Tire 7 | 115 | 101 |
| Test Tire 8 | 99 | 101 |
| Test Tire 9 | 105 | 99 |
| Test Tire 10 | 108 | 98 |
| Test Tire 11 | 111 | 97 |
| Test Tire 12 | 96 | 99 |
| Test Tire 13 | 99 | 98 |
| Test Tire 14 | 100 | 97 |
| Test Tire 15 | 102 | 95 |
| Test Tire 16 | 104 | 94 |
| Conventional Tire | 100 | 100 |

As shown in Tables 1 and 3, among test tires for which the ratio W/L was 0.28 or 0.31, at least one of fuel efficiency and passenger comfort was worse than the conventional tire. Conversely, Test Tires 1 through 7, for which the ratio W/L was 0.24 or less, all had both better fuel efficiency and passenger comfort than the conventional tire.

In this way, the inventors discovered that setting the ratio W/L in a pneumatic radial tire for passenger cars to be 0.24 or less can improve passenger comfort for the vehicle while also reducing both air resistance of the vehicle and rolling resistance of the tire as well as enhancing fuel efficiency.

The inventors performed various other tests to assess various other tire characteristics of the above tires with a ratio W/L of 0.24 or less.

The tests assessed the cornering power and wear resistance of Test Tires 3 and 4, with the structure illustrated in FIG. 3(a), as compared to the conventional tire. The assessment method for each test is as follows.

Cornering Power

In a flat-belt cornering test machine, measurement was performed at an internal pressure of 220 kPa, a load of 3.5 kN, and a speed of 100 km/h.

The cornering power was assessed as an index with the cornering power of the conventional tire as 100. A larger index indicates a larger, more preferable cornering power.

Wear Resistance

An internal pressure of 220 kPa was applied to the above tires. A drum test was then performed applying a load of 3.5 kN and running the tires 30,000 km at a speed of 80 km/h.

The wear resistance was assessed by calculating the terminating groove amount after the above drum running and is expressed as an index with the resistance to uneven wear of the conventional tire as 100. A smaller index indicates better resistance to uneven wear.

TABLE 4

|  | Cornering Power | Wear Resistance |
|---|---|---|
| Test Tire 3 | 94 | 80 |
| Test Tire 4 | 90 | 70 |
| Conventional Tire | 100 | 100 |

Based on the assessment results listed in Table 4, Test Tires 3 and 4, with a ratio W/L of 0.24 or less, have worse cornering power and wear resistance than the conventional tire with a ratio W/L of 0.28. The inventors thus determined that these points require improvement.

The inventors thoroughly investigated the cause of the above decrease in tire performance. As a result, the inventors discovered that the decrease in tire performance is due to how, in a radial tire for which the ratio W/L is 0.24 or less, the narrow section width of the tire causes the input (pressure) from the road surface to increase and the belt to compress, making it easier for a phenomenon of lifting of the contact patch, i.e. a buckling phenomenon, to occur in particular near the middle of the tread half width (i.e. the ¼ point) at the outer half of the tread surface in the vehicle-mounted tire.

In particular, in a tire with a circumferential groove near the above ¼ point, the rigidity of the circumferential groove portion decreases, thereby causing the buckling phenomenon to occur near the circumferential groove.

The inventors newly discovered that by providing a width direction groove in the second land portion of the tread from the outside of the vehicle-mounted tire, the groove extending in the tire width direction and terminating within this land portion, it is possible to distribute the compression stress on the outside of the land portion in the vehicle-mounted tire and to maintain rigidity corresponding to tensile stress at the inside of the land portion, thereby reducing deformation of the belt and suppressing buckling.

The following describes the tread pattern of a tire according to the present invention in detail with reference to the drawings.

FIGS. 3(a) and 3(b) are cross-sectional diagrams in the width direction of a tire according to the present invention. As illustrated in FIGS. 3(a) and 3(b), a tire according to the present invention is provided with bead cores 1 respectively embedded in a pair of bead portions, a carcass 2 toroidally extending across the bead cores 1, and a belt 3 and tread in this order outside of the carcass 2 in the radial direction.

Figure 5:
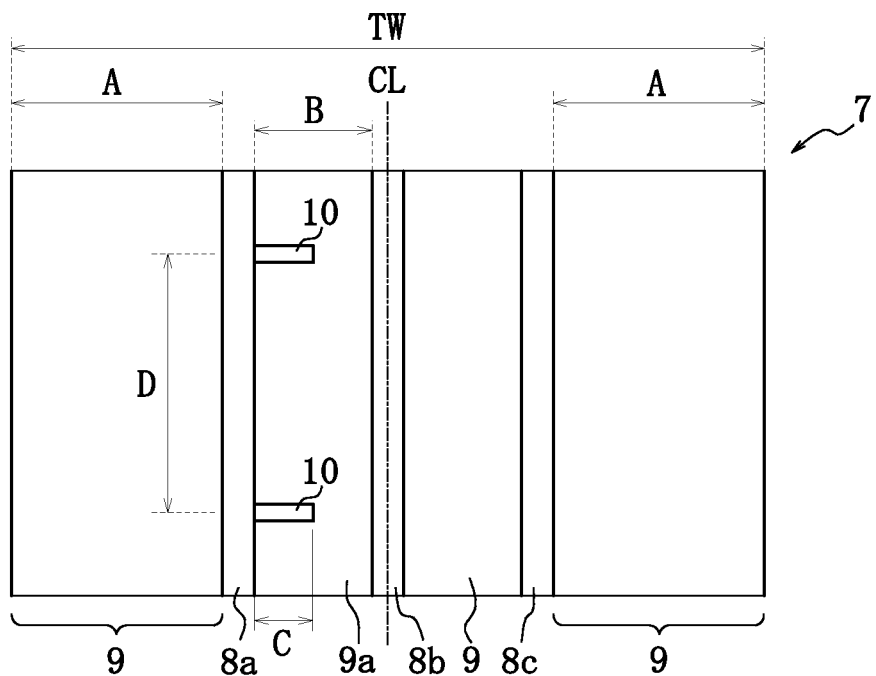
FIGS. 5(a) and 5(b) are schematic development views of the tread surface of a tire according to an embodiment of the present invention.
Figure 5:
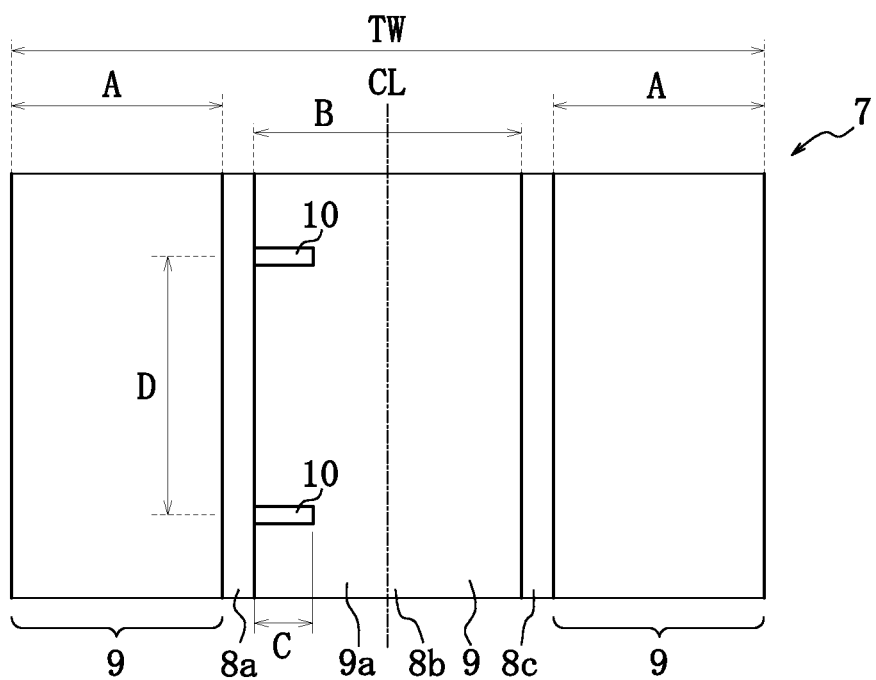

FIGS. 5(a) and 5(b) are tread development views schematically illustrating the tread surface of the tire according to the present invention shown in FIGS. 3(a) and 3(b).

As illustrated in FIGS. 5(a) and 5(b), a tire according to the present invention has at least one main groove in at least one half of the tread surface 7 divided by the tire equatorial plane CL.

In the example illustrated in FIG. 5(a), three main grooves 8a, 8b, 8c are provided in the entire tread surface 7, whereas in the example illustrated in FIG. 5(b), two main grooves 8a, 8c are provided in the entire tread surface 7.

When only one main groove is provided in the tread surface, "has in one half" refers to the half in which the entire main groove is located and does not include the case of when a portion of the main groove extends into the other half.

In the tire according to the present invention, in at least one side in the tread width direction of the tread surface 7, in both sides in the examples illustrated in FIGS. 5(a) and 5(b), a tread edge TE and main grooves 8a and 8c adjacent to the tread edge TE are separated in the tread width direction by a distance of at least 25% of the tread width TW (mm). Specifically, the following relationship is satisfied:

$$A/TW \geq 0.25$$

where A is the width in mm in the tread width direction of a tread edge land portion 9 defined by the tread edge TE and the main grooves 8a, 8c adjacent to the tread edge TE.

In other words, the main groove adjacent to the tread edge TE is separated from the tread edge TE in the tread width direction by a distance of at least 25% of the tread width TW (mm) and is the closest groove to the tread edge TE. The groove depth is 5 mm or more.

Furthermore, at one side of the tread surface 7, the tire includes at least one transverse groove 10, two within the range in the figures, in a land portion 9a adjacent to the tread edge land portion 9 sandwiched between the tread edge TE and the adjacent tread edge main groove 8a, i.e. in the land portion 9a that is second from the tread edge TE at one side of the tread surface 7. Each transverse groove 10 extends from the tread edge main groove 8a in the tread width direction and terminates within the land portion 9a.

Here, the transverse grooves 10 in the figures are not inclined with respect to the tread width direction yet alternatively may be inclined at an angle of 30° or less with respect to the leading edge or trailing edge in the vehicle-mounted tire.

The following describes the operations and effects of the present invention when the tire according to the present invention is mounted on a vehicle so that the side on which each transverse groove 10 is provided is towards the outside of the vehicle in the tread width direction.

Figure 6:
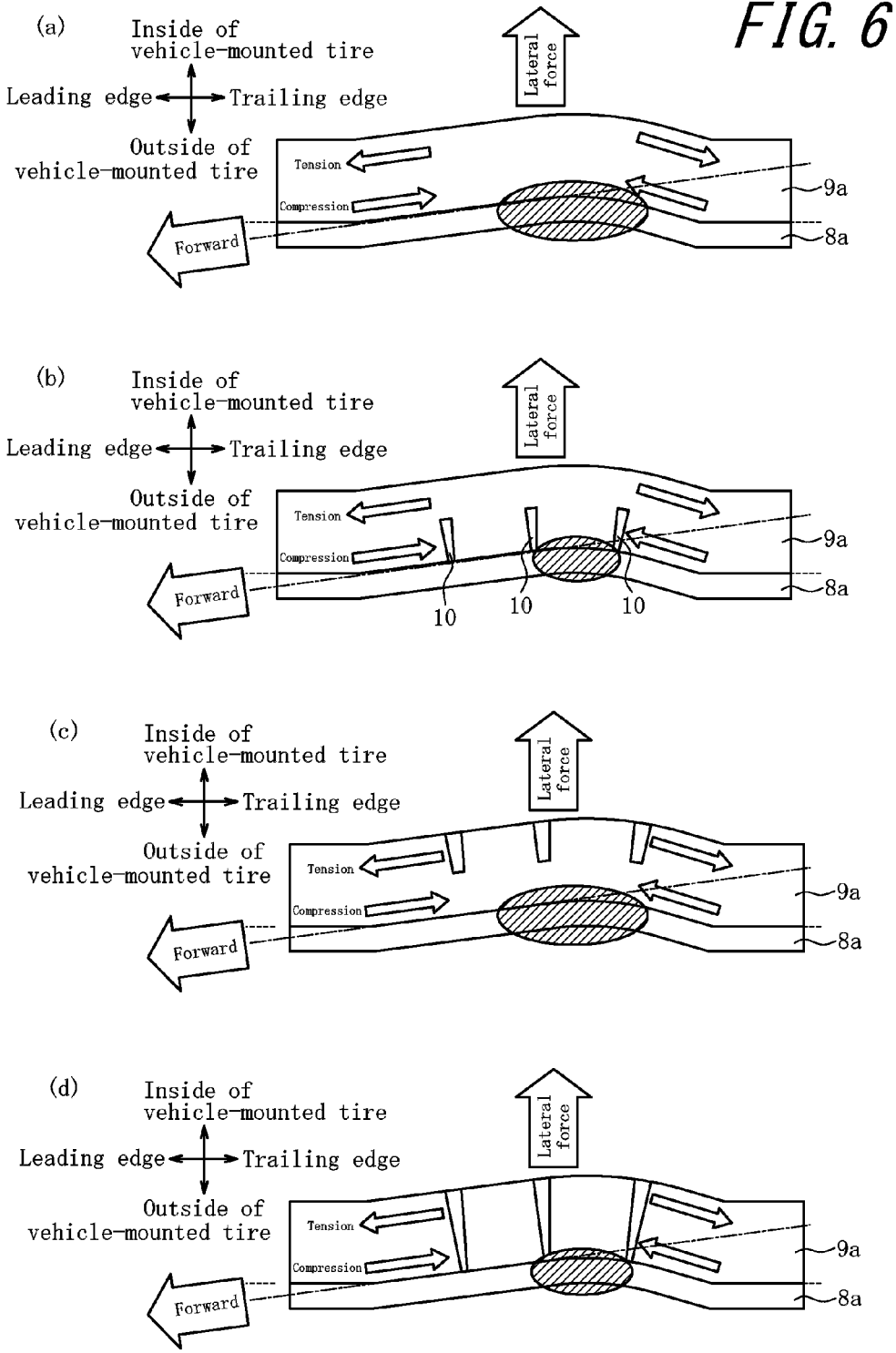
FIG. 6 illustrates the operations and effects of the present invention.

FIG. 6(a) schematically illustrates the state of the outermost main groove 8a in a vehicle-mounted tire and the second land portion 9a from the outside of the vehicle-mounted tire when a lateral force occurs in the tire according to the present invention.

As described above, rigidity decreases near the outermost main groove 8a, and therefore the effects of input from the road surface during cornering are great near the outermost main groove 8a.

As illustrated in FIG. 6(a), the land portion 9a receives compression stress at the outside and tensile stress at the inside of the vehicle-mounted tire. These stresses cause the tread rubber and the belt to deform and the contact patch to lift (in FIG. 6(a), the lifted region is schematically illustrated by the shaded oval).

Here, as illustrated in FIG. 6(b), the tire according to the present invention has transverse grooves 10, in the land portion 9a, extending from the outermost main groove 8a in the tread width direction and terminating in the land portion 9a. Therefore, the tire has a structure such that at the outside of the land portion 9a in the vehicle-mounted tire, the transverse grooves 10 close due to the compression stress, thereby suppressing deformation of the tread and the belt due to the compression stress as compared to when no transverse grooves 10 are provided as in FIG. 6(a) or when the transverse grooves do not extend to the outside of the vehicle-mounted tire as in FIG. 6(c).

Furthermore, as illustrated in FIG. 6(b), in the tire according to the present invention, the transverse grooves 10 terminate within the land portion 9a. Therefore, as compared to when the transverse grooves extend to the inside of the vehicle-mounted tire as in FIGS. 6(c) and 6(d), rigidity is high with respect to tensile stress at the inside of the vehicle-mounted tire, thereby suppressing deformation of the tread and the belt.

Note that in the tire according to the present invention, since the relationship A/TW≥0.25 is satisfied in at least one half of the tread, the tire is preferably mounted onto a vehicle with the side satisfying this relationship on the outside of the vehicle, thereby increasing the area of the land portion furthest outside in the vehicle-mounted tire and achieving cornering power. Furthermore, if rigidity is too high, the shear force becomes too high for the displacement and exceeds static friction, causing the tire to slip and preventing cornering power from being achieved. The relationship A/TW≤0.4 is therefore preferably satisfied.

In such a tire according to the present invention, in-plane bending deformation of the tread and the belt is suppressed when a lateral force occurs during cornering, thus suppressing lifting in the tread patch and thereby enhancing cornering power and wear resistance.

Here, the transverse grooves 10 may alternatively be provided in only one of the halves in the tread width direction, and the above effects may be achieved by mounting the tire so that the half including the transverse groove 10 is on the tire-mounted outside.

A plurality of the transverse grooves 10 is preferably provided at intervals in the tread circumferential direction of E/4 (mm) or more, where E is a contact length of the tire in the circumferential direction in mm.

The reason is that setting the intervals to be E/4 (mm) or more guarantees the rigidity of the land portion 9a and enhances cornering power and wear resistance.

Furthermore, the land portion 9a adjacent to the tread edge land portion 9 preferably does not include a dividing groove that divides the adjacent land portion 9a in the circumferential direction. In other words, the land portion 9a preferably does not have a block pattern, thereby guaranteeing rigidity.

Note that when the transverse grooves 10 are inclined with respect to the tread width direction, the transverse groove intervals are defined by the distance between points of intersection of the transverse grooves 10 and the outermost main groove 8a in the vehicle-mounted tire.

In order to reduce the difference in rigidity in the tread circumferential direction insofar as possible, the transverse grooves 10 are preferably disposed at equal intervals in the tread circumferential direction.

When dividing grooves or sipes are provided in the land portion 9a, the intervals in the circumferential direction refer to the intervals as though the dividing grooves or sipes were not provided.

Furthermore, the intervals in the circumferential direction are preferably E/2 or less. The reason is that no advantageous effect is achieved if at least one transverse groove 10 is not located in the contact region regardless of the contact timing.

Note that the intervals in the circumferential direction may vary in the tread circumferential direction. In this case, the intervals preferably vary in a range of E/4 or more and E/2 or less.

Here, the contact length refers to the maximum length in the circumferential direction along a tire center line in the contact patch between the tire and road surface. The "tire patch" refers to the area of contact between the tire and the road surface when the tire is mounted on a rim and the standard internal pressure and standard maximum load for the vehicle on which the tire is mounted are applied.

The "standard maximum load for the vehicle on which the tire is mounted" refers to the applied load of the tire, among the four wheels, on which the largest load is placed assuming the maximum number of passengers.

The following relationship is preferably satisfied:

$$B/3 \leq C \leq 2B/3$$

where B is the width of the land portion 9a in the tread width direction in mm and C is the length of the transverse groove 10 in the tread width direction in mm.

The reason is that by guaranteeing a length of B/3 or more, the above-described compression stress can be sufficiently absorbed by the deformation caused by the transverse grooves closing, and bending deformation of the tread and belt can be further suppressed. On the other hand, by guaranteeing a length of 2B/3 or less, rigidity with respect to the above-described tensile stress can be sufficiently guaranteed, and bending deformation of the tread and belt can be further suppressed.

Note that when the transverse grooves 10 are inclined with respect to the tread width direction, C mm is defined as the length of the transverse grooves 10 as projected on a line parallel to the tread width direction.

Furthermore, B mm is the distance in the width direction between the tread edge main groove and the main groove that is adjacent to the tread edge main groove inwards in the tire width direction. When only one groove is provided in the tread half (two grooves in the entire tread), however, as illustrated in FIG. 3(b) and FIG. 5(b), B mm is the distance in the tread width direction between the tread edge main groove in one tread half and the tread edge main groove in the other tread half.

Here, the groove depth of the main grooves 8a, 8b, 8c is preferably from 6 to 8 mm. The reason is that a depth of 6 mm or more can restrict the speed at which hydroplaning occurs, while a depth of 8 mm or less can increase shear rigidity in the width direction of the block, thus guaranteeing cornering power.

Furthermore, the maximum depth of the transverse grooves 10 is preferably 4 mm or more and equal to or less than the groove depth of the main grooves. The reason is that a depth of 4 mm or more can lessen circumferential direction rigidity and suppress buckling, while a depth equal to or less than the groove depth of the main grooves can guarantee circumferential direction rigidity of the block so as to achieve cornering power.

Note that the groove width of the main grooves 8a, 8b, 8c and the transverse grooves 10 can be determined taking into account the negative ratio of the tread pattern.

The groove width of the transverse grooves 10 and the groove depth of the transverse grooves 10 may both vary along the length of the transverse grooves 10.

Figure 7:
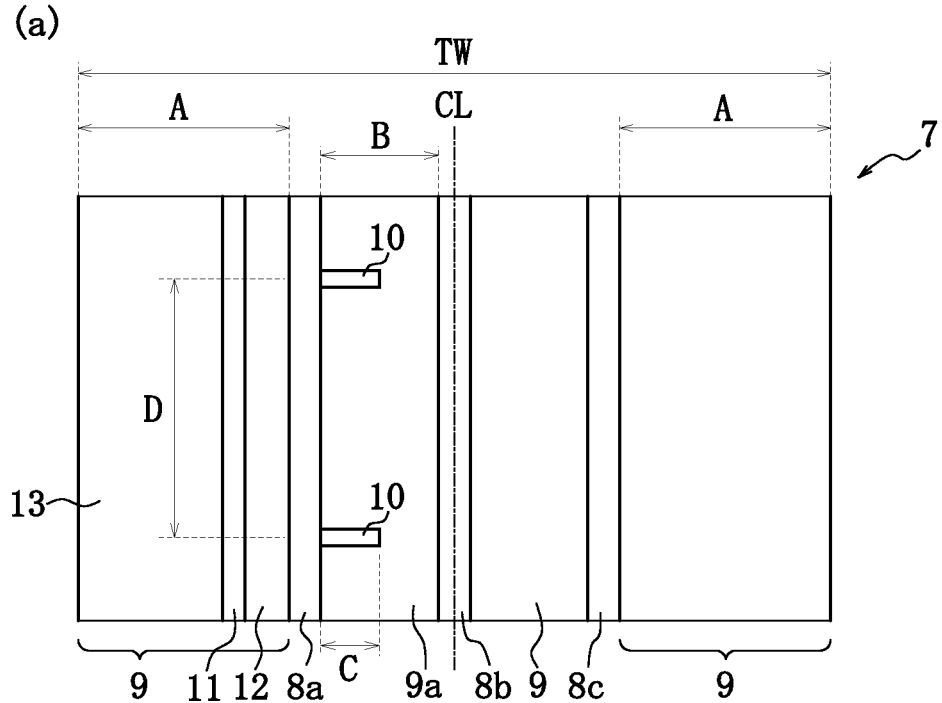
FIGS. 7(a) and 7(b) are schematic development views of the tread surface of a tire according to another embodiment of the present invention.
Figure 7:
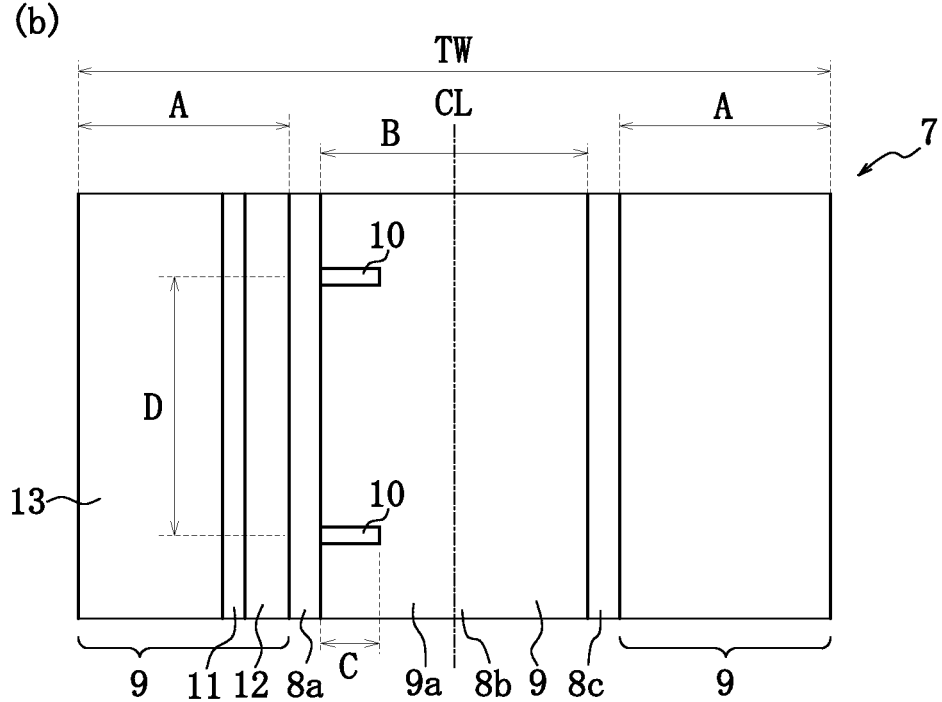

As shown in FIG. 7, in the present invention, an auxiliary groove 11 extending in the tread circumferential direction is preferably provided in the tread edge land portion 9.

With this structure, it becomes easier for a sub-land portion 12, defined by the auxiliary groove 11 and the main groove 8a adjacent to the auxiliary groove 11, mainly to receive the lifting force from the road surface when a lateral force occurs, thereby improving ground contact performance of the other land portions and enhancing cornering power and wear resistance.

Figure 8:
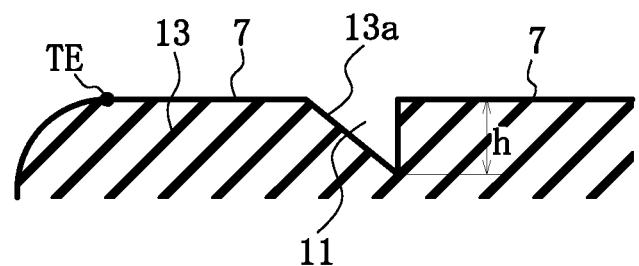
FIG. 8 is a schematic cross-sectional diagram in the tire width direction illustrating the shape of the outermost land portion in a vehicle-mounted tire.
Figure 8:
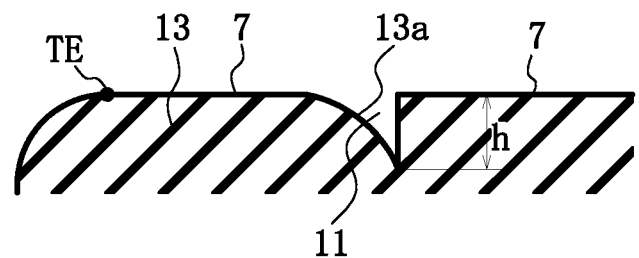
Figure 8:
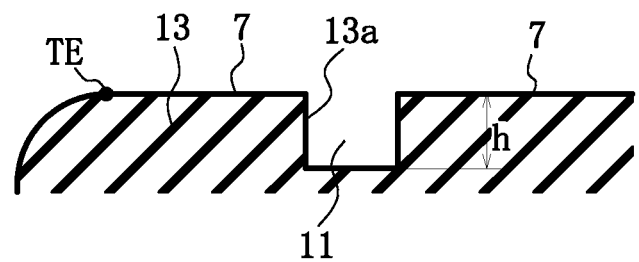

FIGS. 8(a) through 8(c) are schematic cross-sectional diagrams in the tire width direction illustrating the shape of a land portion 13 defined by the tread edge TE and the auxiliary groove 11.

As illustrated in FIGS. 8(a) and 8(b), the sidewall 13a of the land portion 13 defined by the tread edge TE and the auxiliary groove 11 preferably extends inwards in the tread width direction with increasing distance in the groove depth direction.

The reason is that this structure increases rigidity of the outermost land portion in the vehicle-mounted tire and further enhances cornering power as compared to when the sidewall extends straight in the groove depth direction as in FIG. 8(c).

Here, the groove depth h of the auxiliary groove 11 is preferably from 2 to 3 mm. The reason is that a depth of 2 mm or more can cause the lifting from the contact patch to affect only the sub-land portion, thereby suppressing the lifting of other land portions, while a depth of 3 mm or less can guarantee block rigidity of the sub-land portion and guarantee cornering power.

Note that since the negative ratio of the tread pattern is set to a desired value, the groove width of the auxiliary groove 11 can be set as needed taking into account the groove widths of the main grooves 8a, 8b, 8c and the transverse grooves 10.

Figure 9:
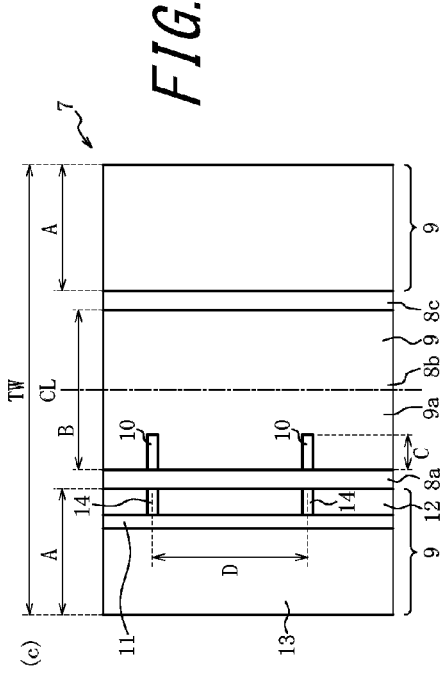
FIGS. 9(a) through (d) are schematic development views of the tread surface of a tire according to an embodiment of the present invention.
Figure 9:
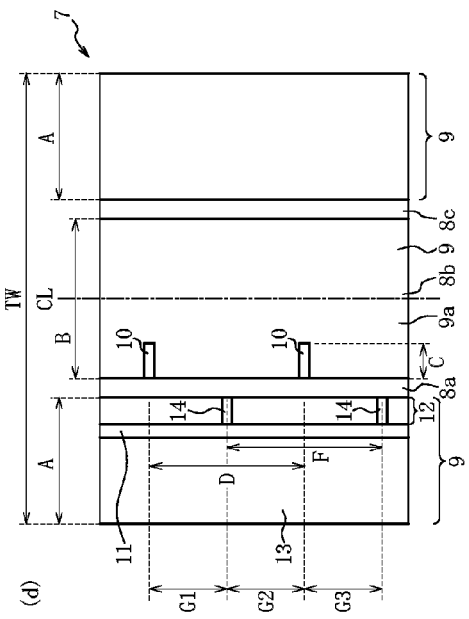
Figure 9:
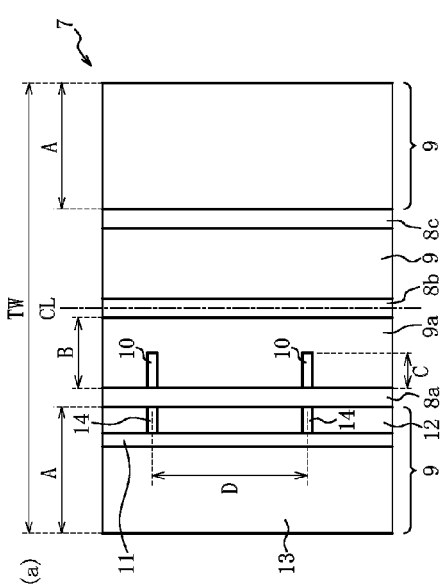
Figure 9:
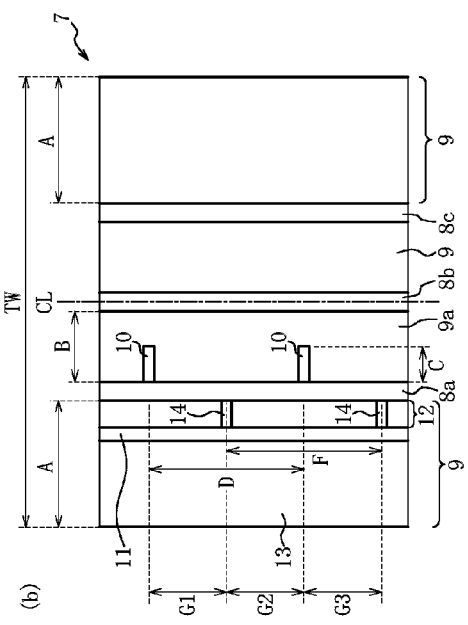

Furthermore, as illustrated in FIG. 9(a), at least one width direction groove 14, two within the range in FIG. 9(a), is preferably provided at intervals in the tread circumferential direction in the sub-land portion 12 defined by the tread edge main groove 8a and the auxiliary groove 11, each width direction groove 14 extending in the tread width direction and connecting the tread edge main groove 8a and the auxiliary groove 11.

With this structure, the sub-land portion that is lifted upon receiving the force of lifting is divided in the tread circumferential direction, so that only a portion of the sub-land portion is lifted from the road surface, thereby improving ground contact performance of the other sub-land portions and enhancing cornering power and wear resistance.

Here, the groove depth of the width direction grooves 14 is preferably from 2 to 3 mm. The reason is that a depth of 2 mm or more can cause the lifting from the contact patch to affect only the sub-land portion, thereby suppressing the lifting of land portions adjacent in the circumferential direction, while a depth of 3 mm or less can guarantee block rigidity of the sub-land portion and guarantee cornering power.

Note that since the negative ratio of the tread pattern is set to a desired value, the groove width of the width direction grooves 14 can be set as needed taking into account the groove widths of the main grooves 8a, 8b, 8c and the transverse grooves 10.

A plurality of the width direction grooves 14 is preferably provided at intervals in the tread circumferential direction of E/4 (mm) or more, where E is a contact length of the tire in the circumferential direction in mm.

The reason is that setting the interval to be E/4 (mm) or more guarantees the block rigidity in the circumferential direction of the sub-land portion and enhances cornering power.

Furthermore, in order to prevent the difference in rigidity in the tread circumferential direction from increasing, the width direction grooves 14 are preferably disposed at equal intervals in the tread circumferential direction.

The intervals are preferably E/2 or less. The reason is that no advantageous effect is achieved if at least one transverse groove 10 is not located in the contact region regardless of the contact timing.

Furthermore, in order to reduce pattern noise, the phase of the width direction grooves 14 is preferably shifted in the tire circumferential direction with respect to the transverse grooves 10, as illustrated in FIG. 9(b). In other words, the width direction grooves 14 are preferably provided so as not to overlap the transverse grooves 10 when projected in the tire width direction.

The intervals (phase difference) of G mm (G1, G2, G3 in FIG. 9(b)) in the tire circumferential direction between the width direction grooves 14 and the transverse grooves 10 are preferably within the following range:

$$D/3 \leq G \leq 2D/3.$$

The reason is that a range of D/3 or more and 2D/3 or less allows for a large interval from the transverse grooves 10 in the circumferential direction, thereby achieving the effect of sufficiently reducing pattern noise.

Note that the tire of the present invention preferably has an air volume of 15,000 cm³ or more. The reason is that this value is necessary to maintain the minimum tire load capability for a passenger car drivable on public roads.

EXAMPLES

As Test Tires 17 through 52, tires having the type of tread pattern illustrated in FIGS. 5(a), 5(b), 7(a), 7(b), 9(a), and 9(c) and the tire structure illustrated in FIGS. 3(a) and 3(b) were produced. The tires were mounted on a vehicle so that the side having a transverse groove extending in the tread width direction from the tread edge main groove and terminating in the adjacent land portion was on the outside of the vehicle, and tests to assess various tire characteristics were performed.

Tables 5 and 6 list the specifications for each tire, and Tables 7 and 8 list the assessment results.

Here, since Test Tires 3 and 4 have no auxiliary groove, "N/A" in Tables 5 and 6 indicates that no specification could be made.

As for tire weight, the weight of the tire was measured and is expressed in Table 7 as an index with the weight of Test Tire 4 as 100. A smaller value indicates a lower weight. In Table 8, the tire weight is expressed as an index with the weight of Test Tire 34 as 100, and a smaller value indicates a lower weight.

The method of assessing other characteristics was as described above. The cornering power, wear resistance, and fuel efficiency are represented in Table 7 as an index with the values for Test Tire 4 as 100. In all cases, a larger value is better. In Table 8, these characteristics are represented as an index with the values for Test Tire 34 as 100, and a larger value indicates better performance.

Here, in all of the test tires in Table 5, the groove width of the central main groove among the three main grooves is 4.5 mm, the groove width of the two main grooves on either side of the central main groove is 6.2 mm, and the groove depth is 7 mm. In all of the tires in Table 6, the two main grooves have a groove width of 6.2 mm and a groove depth of 7 mm.

In all of the tires having a transverse groove in the second land portion from the outside of the vehicle-mounted tire, the transverse groove has a groove width of 10 mm and a groove depth of 5.5 mm.

Furthermore, in all of the test tires having an auxiliary groove, the groove depth of the auxiliary groove is 2 mm.

In all of the test tires having width direction grooves in the sub-land portion, the groove width and the groove depth of the width direction grooves are both 2 mm.

Note that the main grooves and the auxiliary groove extend in the tread circumferential direction, whereas the transverse grooves provided in the land portion adjacent to the tread edge land portion as well as the width direction grooves provided in the sub-land portion extend in the tread width direction with no inclination.

The "transverse groove interval" in Table 1 refers to the intervals in the tread circumferential direction between transverse grooves provided in the second land portion from the outside of the vehicle-mounted tire.

In the tire with a size of 155/70R17, the tread width TW is 102 mm, and in the tire with a size of 155/55R19, the tread width TW is 110 mm.

TABLE 5

Figure 10:
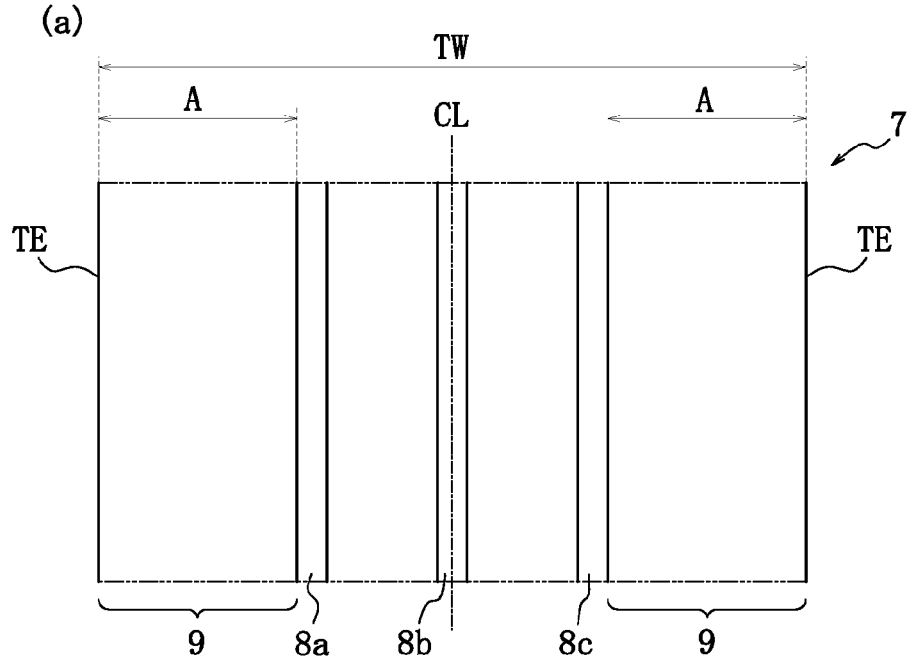
FIG. 10 is a schematic development view of the tread surface of a tire having a tread pattern without an auxiliary groove.
Figure 10:
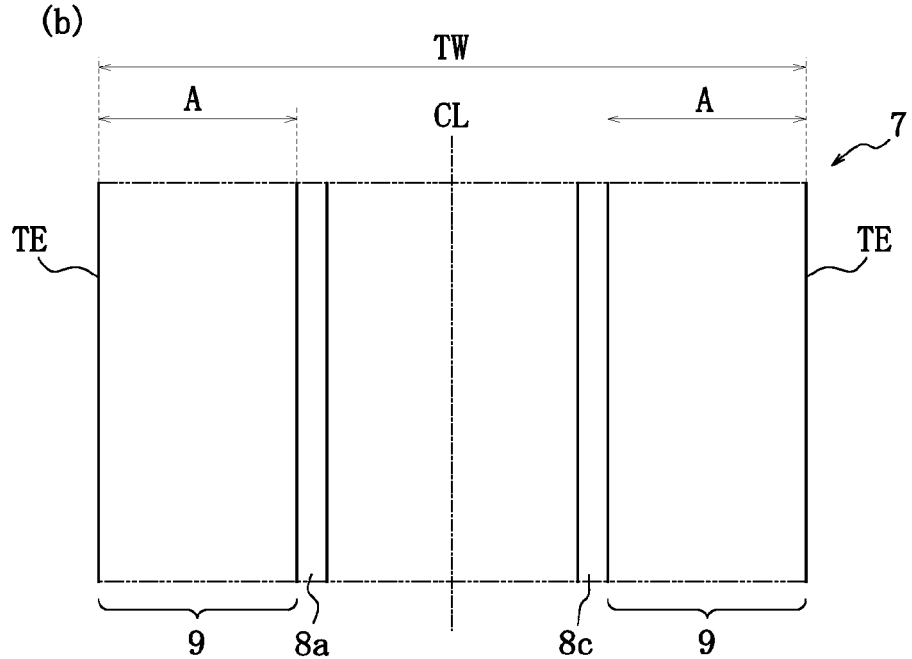

| | Tire Size | Tire Structure | Tread Type | A (mm) | A/TW | Contact Length E (mm) | Transverse Groove Interval (mm) | B (mm) | C (mm) | C/B |
|---|---|---|---|---|---|---|---|---|---|---|
| Test Tire 4 | 155/70R17 | FIG. 3(a) | FIG. 10(a) | 26 | 0.255 | 130 | N/A | 20 | N/A | N/A |
| Test Tire 17 | 155/70R17 | FIG. 3(a) | FIG. 5(a) | 26 | 0.255 | 133 | 36 | 20 | 10 | 0.5 |
| Test Tire 18 | 155/70R17 | FIG. 3(a) | FIG. 7(a) | 26 | 0.255 | 133 | 36 | 20 | 10 | 0.5 |
| Test Tire 19 | 155/70R17 | FIG. 3(a) | FIG. 9(a) | 26 | 0.255 | 134 | 36 | 20 | 10 | 0.5 |
| Test Tire 20 | 155/70R17 | FIG. 3(a) | FIG. 5(a) | 25 | 0.245 | 133 | 36 | 20 | 10 | 0.5 |
| Test Tire 21 | 155/70R17 | FIG. 3(a) | FIG. 5(a) | 26 | 0.255 | 134 | 31 | 20 | 10 | 0.5 |
| Test Tire 22 | 155/70R17 | FIG. 3(a) | FIG. 5(a) | 26 | 0.255 | 131 | 36 | 20 | 5 | 0.25 |
| Test Tire 23 | 155/70R17 | FIG. 3(a) | FIG. 5(a) | 26 | 0.255 | 134 | 36 | 20 | 15 | 0.75 |
| Test Tire 3 | 155/55R19 | FIG. 3(a) | FIG. 10(a) | 28 | 0.255 | 100 | N/A | 20 | N/A | N/A |
| Test Tire 24 | 155/55R19 | FIG. 3(a) | FIG. 5(a) | 28 | 0.255 | 102 | 28 | 20 | 10 | 0.5 |
| Test Tire 25 | 155/55R19 | FIG. 3(a) | FIG. 7(a) | 28 | 0.255 | 102 | 28 | 20 | 10 | 0.5 |
| Test Tire 26 | 155/55R19 | FIG. 3(a) | FIG. 9(a) | 28 | 0.255 | 103 | 28 | 20 | 10 | 0.5 |
| Test Tire 27 | 155/55R19 | FIG. 3(a) | FIG. 5(a) | 27 | 0.245 | 102 | 28 | 20 | 10 | 0.5 |
| Test Tire 28 | 155/55R19 | FIG. 3(a) | FIG. 5(a) | 28 | 0.255 | 103 | 23 | 20 | 10 | 0.5 |
| Test Tire 29 | 155/55R19 | FIG. 3(a) | FIG. 5(a) | 28 | 0.255 | 101 | 28 | 20 | 5 | 0.25 |
| Test Tire 30 | 155/55R19 | FIG. 3(a) | FIG. 5(a) | 28 | 0.255 | 103 | 28 | 20 | 15 | 0.75 |
| Test Tire 31 | 155/70R17 | FIG. 3(a) | FIG. 5(a) | 26 | 0.255 | 133 | 36 | 20 | 7 | 0.35 |
| Test Tire 32 | 155/70R17 | FIG. 3(a) | FIG. 5(a) | 26 | 0.255 | 132 | 36 | 20 | 6 | 0.3 |
| Test Tire 33 | 155/70R17 | FIG. 3(a) | FIG. 5(a) | 26 | 0.255 | 134 | 36 | 20 | 11 | 0.55 |

TABLE 6

| | Tire Size | Tire Structure | Tread Type | A (mm) | A/TW | Contact Length E (mm) | Transverse Groove Interval (mm) | B (mm) | C (mm) | C/B |
|---|---|---|---|---|---|---|---|---|---|---|
| Test Tire 34 | 155/70R17 | FIG. 3(b) | FIG. 10(b) | 26 | 0.255 | 130 | N/A | 44.5 | N/A | N/A |
| Test Tire 35 | 155/70R17 | FIG. 3(b) | FIG. 5(b) | 26 | 0.255 | 133 | 36 | 44.5 | 20 | 0.45 |
| Test Tire 36 | 155/70R17 | FIG. 3(b) | FIG. 7(b) | 26 | 0.255 | 133 | 36 | 44.5 | 20 | 0.45 |
| Test Tire 37 | 155/70R17 | FIG. 3(b) | FIG. 9(c) | 26 | 0.255 | 134 | 36 | 44.5 | 20 | 0.45 |
| Test Tire 38 | 155/70R17 | FIG. 3(b) | FIG. 5(b) | 25 | 0.245 | 133 | 36 | 44.5 | 20 | 0.45 |
| Test Tire 39 | 155/70R17 | FIG. 3(b) | FIG. 5(b) | 26 | 0.255 | 134 | 31 | 44.5 | 20 | 0.45 |
| Test Tire 40 | 155/70R17 | FIG. 3(b) | FIG. 5(b) | 26 | 0.255 | 131 | 36 | 44.5 | 14 | 0.31 |
| Test Tire 41 | 155/70R17 | FIG. 3(b) | FIG. 5(b) | 26 | 0.255 | 134 | 36 | 44.5 | 30 | 0.67 |
| Test Tire 42 | 155/55R19 | FIG. 3(b) | FIG. 10(b) | 28 | 0.255 | 100 | N/A | 44.5 | N/A | N/A |
| Test Tire 43 | 155/55R19 | FIG. 3(b) | FIG. 5(b) | 28 | 0.255 | 102 | 28 | 44.5 | 20 | 0.45 |
| Test Tire 44 | 155/55R19 | FIG. 3(b) | FIG. 7(b) | 28 | 0.255 | 102 | 28 | 44.5 | 20 | 0.45 |
| Test Tire 45 | 155/55R19 | FIG. 3(b) | FIG. 9(c) | 28 | 0.255 | 103 | 28 | 44.5 | 20 | 0.45 |
| Test Tire 46 | 155/55R19 | FIG. 3(b) | FIG. 5(b) | 27 | 0.245 | 102 | 28 | 44.5 | 20 | 0.45 |

TABLE 6-continued

| | Tire Size | Tire Structure | Tread Type | A (mm) | A/TW | Contact Length E (mm) | Transverse Groove Interval (mm) | B (mm) | C (mm) | C/B |
|---|---|---|---|---|---|---|---|---|---|---|
| Test Tire 47 | 155/55R19 | FIG. 3(b) | FIG. 5(b) | 28 | 0.255 | 103 | 23 | 44.5 | 20 | 0.45 |
| Test Tire 48 | 155/55R19 | FIG. 3(b) | FIG. 5(b) | 28 | 0.255 | 101 | 28 | 44.5 | 14 | 0.31 |
| Test Tire 49 | 155/55R19 | FIG. 3(b) | FIG. 5(b) | 28 | 0.255 | 103 | 28 | 44.5 | 30 | 0.67 |
| Test Tire 50 | 155/70R17 | FIG. 3(b) | FIG. 5(b) | 26 | 0.255 | 130 | 36 | 44.5 | 16 | 0.36 |
| Test Tire 51 | 155/70R17 | FIG. 3(b) | FIG. 5(b) | 26 | 0.255 | 134 | 36 | 44.5 | 22 | 0.49 |
| Test Tire 52 | 155/70R17 | FIG. 3(b) | FIG. 5(b) | 26 | 0.255 | 134 | 36 | 44.5 | 24 | 0.54 |

TABLE 7

| | Cornering Power | Wear Resistance | Tire Weight | Fuel Efficiency |
|---|---|---|---|---|
| Test Tire 4 | 100 | 100 | 100 | 100 |
| Test Tire 17 | 104 | 103 | 98 | 102 |
| Test Tire 18 | 106 | 106 | 97 | 103 |
| Test Tire 19 | 107 | 107 | 96 | 104 |
| Test Tire 20 | 97 | 99 | 98 | 97 |
| Test Tire 21 | 102 | 101 | 97 | 101 |
| Test Tire 22 | 101 | 102 | 99 | 101 |
| Test Tire 23 | 101 | 101 | 97 | 101 |
| Test Tire 3 | 104 | 114 | 89 | 113 |
| Test Tire 24 | 109 | 118 | 87 | 115 |
| Test Tire 25 | 111 | 121 | 86 | 116 |
| Test Tire 26 | 112 | 122 | 85 | 117 |
| Test Tire 27 | 101 | 113 | 87 | 111 |
| Test Tire 28 | 107 | 115 | 86 | 114 |
| Test Tire 29 | 105 | 117 | 88 | 114 |
| Test Tire 30 | 105 | 115 | 86 | 114 |
| Test Tire 31 | 104 | 103 | 98 | 102 |
| Test Tire 32 | 101 | 102 | 99 | 101 |
| Test Tire 33 | 104 | 103 | 98 | 102 |

TABLE 8

| | Cornering Power | Wear Resistance | Tire Weight | Fuel Efficiency |
|---|---|---|---|---|
| Test Tire 34 | 100 | 100 | 100 | 100 |
| Test Tire 35 | 104 | 103 | 98 | 102 |
| Test Tire 36 | 106 | 106 | 97 | 103 |
| Test Tire 37 | 107 | 107 | 96 | 104 |
| Test Tire 38 | 97 | 99 | 98 | 97 |
| Test Tire 39 | 102 | 101 | 97 | 101 |
| Test Tire 40 | 101 | 102 | 99 | 101 |
| Test Tire 41 | 101 | 101 | 97 | 101 |
| Test Tire 42 | 104 | 114 | 89 | 113 |
| Test Tire 43 | 109 | 118 | 87 | 115 |
| Test Tire 44 | 111 | 121 | 86 | 116 |
| Test Tire 45 | 112 | 122 | 85 | 117 |
| Test Tire 46 | 101 | 113 | 87 | 111 |
| Test Tire 47 | 107 | 115 | 86 | 114 |
| Test Tire 48 | 105 | 117 | 88 | 114 |
| Test Tire 49 | 105 | 115 | 86 | 114 |
| Test Tire 50 | 103 | 102 | 98 | 101 |
| Test Tire 51 | 104 | 103 | 98 | 102 |
| Test Tire 52 | 104 | 103 | 98 | 102 |

As illustrated in Table 7, a comparison of Test Tire 4 with Test Tires 17 to 19 and 21 to 23, and of Test Tire 3 with Test Tires 24 to 26 and 28 to 30, demonstrates that Test Tires 17 to 19 and 21 to 23 and Test Tires 24 to 26 and 28 to 30 provided with transverse grooves according to the present invention have better cornering power and wear resistance, lower tire weight, and enhanced fuel efficiency as compared to Test Tire 4 and Test Tire 3 respectively.

A comparison of Test Tire 17 with Test Tire 20 and of Test Tire 24 with Test Tire 27 also shows that in Test Tires 20 and 27, for which the A/TW value does not satisfy the conditions of the present invention, at least one of cornering power and wear resistance is worse than Test Tire 4 and Test Tire 3 respectively.

Furthermore, a comparison of Test Tire 17 with Test Tire 18 and of Test Tire 24 with Test Tire 25 indicates that Test Tires 18 and 25, which have an auxiliary groove, have better cornering power and wear resistance, lower tire weight, and enhanced fuel efficiency as compared to Test Tires 17 and 24 respectively.

Moreover, a comparison of Test Tire 18 with Test Tire 19 and of Test Tire 25 with Test Tire 26 indicates that Test Tires 19 and 26, which have width direction grooves, have better cornering power and wear resistance, lower tire weight, and enhanced fuel efficiency as compared to Test Tires 18 and 25 respectively.

Additionally, a comparison of Test Tire 17 with Test Tires 21 to 23 and of Test Tire 24 with Test Tires 28 to 30 indicates that Test Tires 17 and 24, in which the transverse groove interval and C/B values are optimized, have better cornering power and wear resistance than Test Tires 21 to 23 and 28 to 30 respectively.

Finally, Table 8 shows similar assessment results for patterns with two main grooves.

REFERENCE SIGNS LIST

1: Bead core
2: Carcass
3: Belt
4: Tread
5: Belt reinforcing layer
6, 8a, 8b, 8c: Main groove
7: Tread surface
9: Tread edge land portion
10: Transverse groove
11: Auxiliary groove
12: Sub-land portion
13: Land portion
14: Width direction groove
W: Tire section width
L: Tire outside diameter
TE: Tread edge
TW: Tread width
CL: Tire equatorial plane

The invention claimed is:

1. A pneumatic radial tire for passenger cars, provided with a pair of bead portions, a carcass formed by a ply of radial cords toroidally extending between the bead portions, and a tread, comprising:
   a section width W and an outside diameter L such that a ratio W/L is 0.24 or less;
   a tread edge main groove in at least half of a surface of the tread divided by a tire equatorial plane, the tread edge main groove being adjacent to a tread edge, separated from the tread edge in a tread width direction by a distance of at least 25% of a tread width TW, and extending in a tread circumferential direction; and
   at least one transverse groove in an adjacent land portion adjacent to a tread edge land portion defined by the tread edge main groove and the tread edge, the at least one transverse groove extending from the tread edge main groove in the tread width direction and terminating within the adjacent land portion,
   wherein the at least one transverse groove is provided in only one of the halves of the pneumatic radial tire in the tread width direction, and
   wherein the at least one transverse groove comprises a plurality of transverse grooves at intervals in the tread circumferential direction of E/2 (mm) or less, where E is a contact length of the tire in mm.

2. The pneumatic radial tire for passenger cars according to claim 1, wherein the plurality of transverse grooves are at intervals in the tread circumferential direction of E/4 (mm) or more.

3. The pneumatic radial tire for passenger cars according to claim 1, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

4. The pneumatic radial tire for passenger cars according to claim 1, further comprising an auxiliary groove extending in the tread circumferential direction in the tread edge land portion within the half including the at least one transverse groove.

5. The pneumatic radial tire for passenger cars according to claim 4, further comprising at least one width direction groove, at intervals in the tread circumferential direction, in a sub-land portion defined by the tread edge main groove and the auxiliary groove, the at least one width direction groove extending in the tread width direction and connecting the tread edge main groove and the auxiliary groove.

6. The pneumatic radial tire for passenger cars according to claim 2, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

7. The pneumatic radial tire for passenger cars according to claim 1, wherein the pneumatic radial tire is one of 155/55R21, 165/55R21, 155/55R19, 155/70R17, 165/55R20, 165/65R19 and 165/70R18.

8. A pneumatic radial tire for passenger cars, provided with a pair of bead portions, a carcass formed by a ply of radial cords toroidally extending between the bead portions, and a tread, comprising:
   a section width W and an outside diameter L such that a ratio W/L is 0.24 or less;
   a tread edge main groove in at least half of a surface of the tread divided by a tire equatorial plane, the tread edge main groove being adjacent to a tread edge, separated from the tread edge in a tread width direction by a distance of at least 25% of a tread width TW, and extending in a tread circumferential direction; and
   at least one transverse groove in an adjacent land portion adjacent to a tread edge land portion defined by the tread edge main groove and the tread edge, the at least one transverse groove extending from the tread edge main groove in the tread width direction and terminating within the adjacent land portion,
   wherein the at least one transverse groove is provided in only one of the halves of the pneumatic radial tire in the tread width direction, and
   wherein no groove, excepting for the at least one transverse groove, is provided in the adjacent land portion.

9. The pneumatic radial tire for passenger cars according to claim 8, wherein the at least one transverse groove comprises a plurality of transverse grooves at intervals in the tread circumferential direction of E/4 (mm) or more, where E is a contact length of the tire in mm.

10. The pneumatic radial tire for passenger cars according to claim 8, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

11. The pneumatic radial tire for passenger cars according to claim 8, further comprising an auxiliary groove extending in the tread circumferential direction in the tread edge land portion within the half including the at least one transverse groove.

12. The pneumatic radial tire for passenger cars according to claim 11, further comprising at least one width direction groove, at intervals in the tread circumferential direction, in a sub-land portion defined by the tread edge main groove and the auxiliary groove, the at least one width direction groove extending in the tread width direction and connecting the tread edge main groove and the auxiliary groove.

13. The pneumatic radial tire for passenger cars according to claim 9, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

14. The pneumatic radial tire for passenger cars according to claim 8, wherein the pneumatic radial tire is one of 155/55R21, 165/55R21, 155/55R19, 155/70R17, 165/55R20, 165/65R19 and 165/70R18.

15. The pneumatic radial tire for passenger cars according to claim 8, wherein the at least one transverse groove comprises a plurality of transverse grooves at intervals in the tread circumferential direction of E/2 (mm) or less, where E is a contact length of the tire in mm.

16. A passenger car with pneumatic radial tires, the tires being provided with a pair of bead portions, a carcass formed by a ply of radial cords toroidally extending between the bead portions, and a tread, the tires each comprising:
   a section width W and an outside diameter L such that a ratio W/L is 0.24 or less;

a tread edge main groove in at least half of a surface of the tread divided by a tire equatorial plane, the tread edge main groove being adjacent to a tread edge, separated from the tread edge in a tread width direction by a distance of at least 25% of a tread width TW, and extending in a tread circumferential direction; and at least one transverse groove in an adjacent land portion adjacent to a tread edge land portion defined by the tread edge main groove and the tread edge, the transverse groove extending from the tread edge main groove in the tread width direction and terminating within the adjacent land portion, wherein the at least one transverse groove is provided in only one of the halves in the tread width direction, said one of the halves being on the tire-mounted outside.

17. The pneumatic radial tire for passenger cars according to claim 16, wherein the at least one transverse groove comprises a plurality of transverse grooves at intervals in the tread circumferential direction of E/4 (mm) or more, where E is a contact length of the tire in mm.

18. The pneumatic radial tire for passenger cars according to claim 16, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

19. The pneumatic radial tire for passenger cars according to claim 16, further comprising an auxiliary groove extending in the tread circumferential direction in the tread edge land portion within the half including the at least one transverse groove.

20. The pneumatic radial tire for passenger cars according to claim 19, further comprising at least one width direction groove, at intervals in the tread circumferential direction, in a sub-land portion defined by the tread edge main groove and the auxiliary groove, the at least one width direction groove extending in the tread width direction and connecting the tread edge main groove and the auxiliary groove.

21. The pneumatic radial tire for passenger cars according to claim 17, wherein in the half including the at least one transverse groove, the following relationship is satisfied:

$$B/3 \leq C \leq 2B/3$$

where B is a width of the adjacent land portion in the tread width direction in mm and C is a length of the at least one transverse groove in the tread width in mm.

22. The pneumatic radial tire for passenger cars according to claim 16, wherein the pneumatic radial tire is one of 155/55R21, 165/55R21, 155/55R19, 155/70R17, 165/55R20, 165/65R19 and 165/70R18.

23. The pneumatic radial tire for passenger cars according to claim 16, wherein the at least one transverse groove comprises a plurality of transverse grooves at intervals in the tread circumferential direction of E/2 (mm) or less, where E is a contact length of the tire in mm.

* * * * *